(12) United States Patent
Lopez

(10) Patent No.: US 6,581,949 B2
(45) Date of Patent: Jun. 24, 2003

(54) CYCLE SCOOTER

(76) Inventor: Zenon Lopez, 761 W. Betty, Pahrump, NV (US) 89060

(*) Notice: Subject to any disclaimer, the term of this patent is extended or adjusted under 35 U.S.C. 154(b) by 57 days.

(21) Appl. No.: 09/928,734

(22) Filed: Aug. 13, 2001

(65) Prior Publication Data

US 2003/0030242 A1 Feb. 13, 2003

(51) Int. Cl.⁷ .................. B62M 1/14; B62M 1/02
(52) U.S. Cl. .............. 280/278; 280/220; 280/240; 280/261; 280/287
(58) Field of Search ............... 280/240, 87.05, 280/7.1, 7.11, 7.13, 259–261, 220, 287, 278

(56) References Cited

U.S. PATENT DOCUMENTS

| | | | |
|---|---|---|---|
| 597,348 A | * 1/1898 | Winters | 280/240 |
| 2,660,442 A | * 11/1953 | Wiesner et al. | 280/87.05 |
| 4,653,766 A | 3/1987 | Guandalini | |
| D305,134 S | 12/1989 | Rubio et al. | |
| 5,192,089 A | 3/1993 | Taylor | |
| 5,620,189 A | 4/1997 | Hinderhofer | |
| 6,073,949 A | * 6/2000 | O'Hare et al. | 280/283 |
| 6,139,039 A | * 10/2000 | Becker | 280/283 |
| 6,332,565 B1 | * 12/2001 | Tsai | 280/288.4 |

* cited by examiner

Primary Examiner—Lesley D. Morris
Assistant Examiner—Matthew Luby
(74) Attorney, Agent, or Firm—Sturm & Fix LLP

(57) ABSTRACT

A wheeled vehicle that is convertible between a bicycle mode and a scooter mode. The cycle scooter includes a front wheel drive system with an operator seat that is movable between a lowered position that provides for comfortable operation of the vehicle in the bicycle mode, and a raised position for comfortable operation in the scooter mode. The frame includes rear and front portions that are pivotally attached and movable between a folded storage position and an extended operating position.

6 Claims, 2 Drawing Sheets

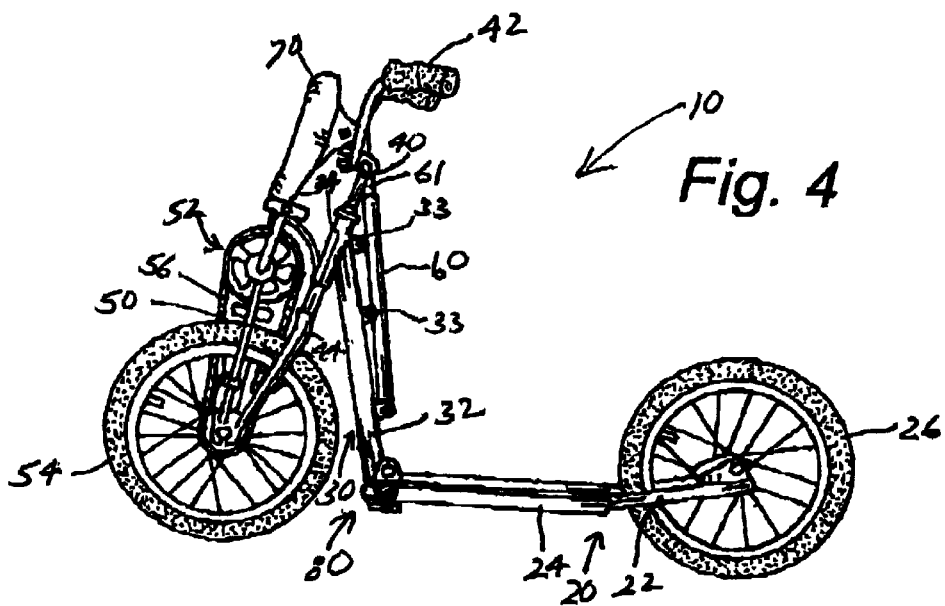
Fig. 4
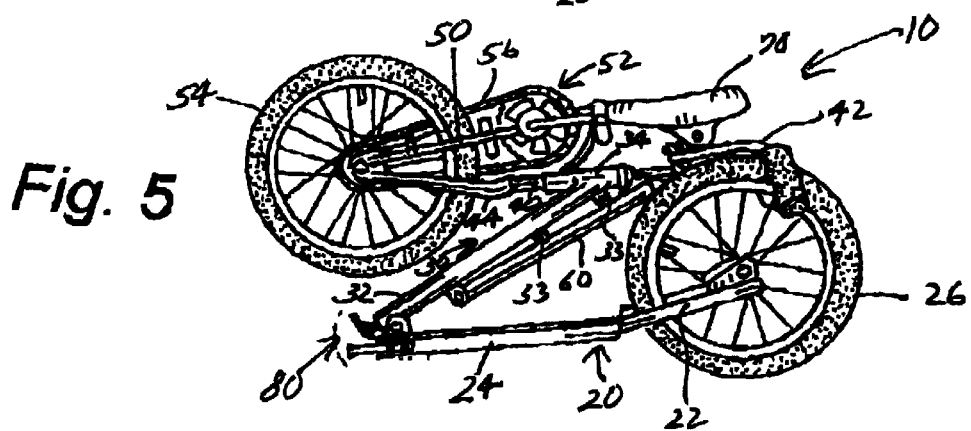
Fig. 5
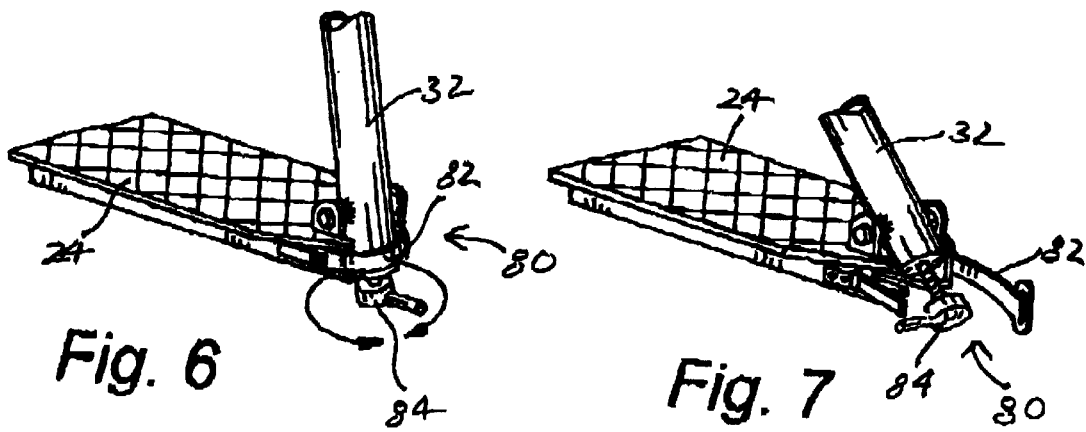
Fig. 6
Fig. 7

CYCLE SCOOTER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of wheeled vehicles, and more particularly to a combination bicycle and scooter.

2. Description of Related Art

As can be seen by reference to the following U.S. Pat. Nos. D305,134; 4,653,766; 5,192,089 and 5,620,189, the prior art is replete with myriad and diverse wheeled vehicles.

While all of the aforementioned prior art constructions are more than adequate for the basic purpose and function for which they have been specifically designed, they are uniformly deficient with respect to their failure to provide a simple, efficient, and practical combination bicycle and scooter.

As a consequence of the foregoing situation, there has existed a longstanding need for a new and improved combination bicycle and scooter and the provision of such a construction is a stated objective of the present invention.

BRIEF SUMMARY OF THE INVENTION

Briefly stated, the present invention provides a wheeled vehicle that is convertible between a bicycle mode and a scooter mode. The cycle scooter includes a front wheel drive system with an operator seat that is movable between a lowered position that provides for comfortable operation of the vehicle in the bicycle mode, and a raised position for comfortable operation in the scooter mode. The frame includes rear and front portions that are pivotally attached and movable between a folded storage position and an extended operating position.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 4 is a side elevational view similar to FIG. 1, but showing the cycle scooter configured in the scooter mode;

FIG. 5 is a side elevational view showing the cycle scooter in the folded storage position;

FIG. 6 is an enlarged partial perspective view showing the strap hinge engaged to secure the rear and front portions of the frame in the extended operating position; and FIG. 7 is an enlarged partial perspective view similar to FIG. 6, but showing the strap hinge released to allow the rear and front portions of the frame to fold to the storage position.

DETAILED DESCRIPTION OF THE INVENTION

Figure 1:
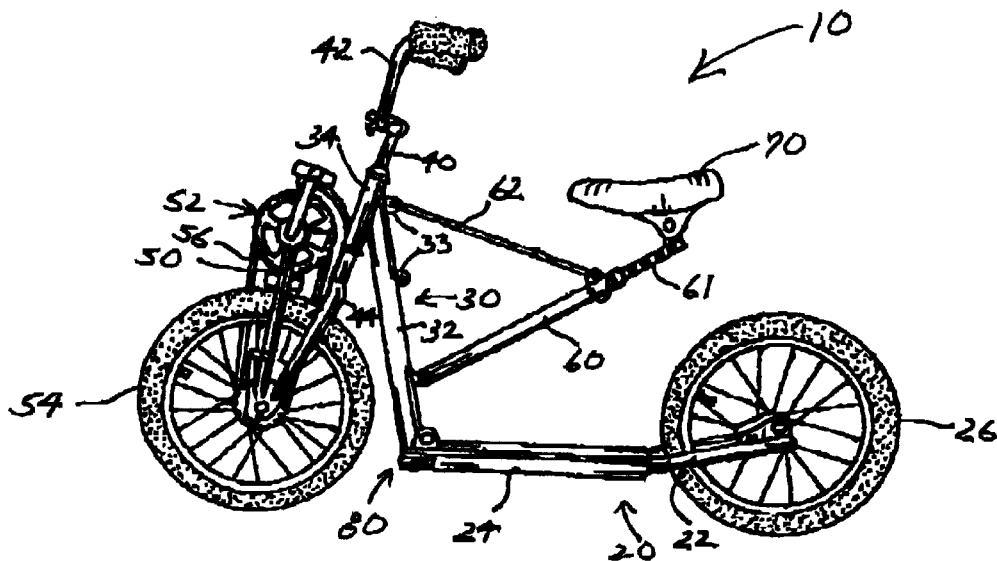
FIG. 1 is a side elevational view of the cycle scooter of the present invention configured in the bicycle mode.
Figure 2:
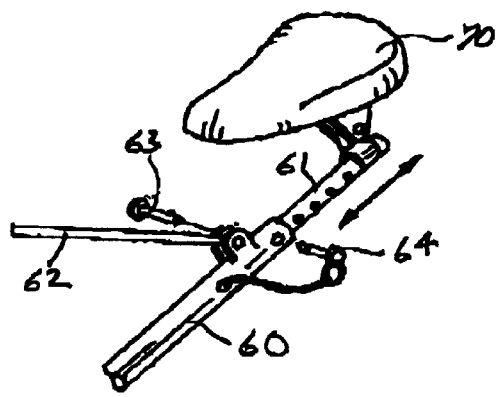
FIG. 2 is an enlarged partial perspective view illustrating the attachment of the stabilizer bar and the adjustment of the operator seat.
Figure 3:
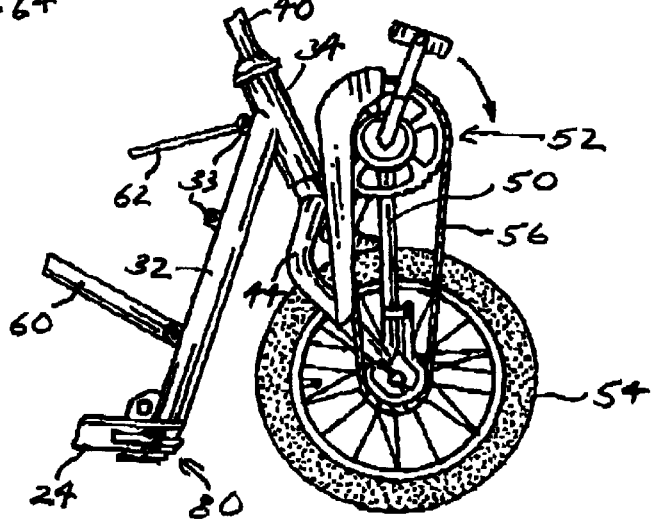
FIG. 3 is an enlarged partial side elevational view showing the pedal crank front wheel drive.

As can be seen by reference to the drawings, and in particularly to FIG. 1, the wheeled vehicle that forms the basis of the present invention is designated generally by the reference number 10. The vehicle 10 includes a frame having a rear frame portion 20 with a rear fork 22 and a horizontal foot platform 24, and a front frame portion 30 with an upwardly extending support 32 and a sleeve 34 at the upper end. A rear wheel 26 is rotatably attached to the rear fork 22. A shaft 40 is pivotally received in the sleeve 34. Steering handle bars 42 are attached at the upper end of the shaft 40 and a front fork 44 is attached to the lower end. A bracket 50 extends up from the front fork 44 and supports a rotatable pedal crank 52. A front wheel 54 is rotatably attached to the front fork 44 and is drivably connected to the pedal crank 52 by a continuous drive chain 56.

A seat support bar 60 is pivotally attached to the support 32 and is movable between the lowered position shown in FIG. 1 and the raised position shown in FIG. 4. When in the lowered position, a stabilizer bar 62 interconnects the upwardly extending support 32 and the seat support bar 60. Tabs 33 extending from the support 32 allows the seat support bar 60 to be selectively secured at various points to the support 32. An adjustment rod 61 is telescopically received in the distal end of the seat support bar and is secured in one of a number of positions by engagement of pin 64. An operator seat 70 is adjustably pivotally attached to the upper end of the adjustment rod 61.

The rear portion 20 and the front portion 30 of the frame are pivotally attached and are movable between a folded storage position shown in FIG. 5, and an extended operating position shown in FIGS. 1 and 4. As shown in FIGS. 6 and 7, a locking mechanism 80 is engaged to lock the frame portions 20 and 30 in the operating position, and is released to allow the frame portions 20 and 30 to fold to the storage position. The locking mechanism 80 includes a strap hinge 82 and a quick release lever 84. The strip hinge 82 extends from the front of the rear frame portion 20 to engage the lower section of the upwardly extending support 32.

In operation, the vehicle 10 is moved from the storage configuration shown in FIG. 5, and the locking mechanism 80 is engaged to lock the frame portions 20 and 30 in the extended operating position shown in FIG. 4. The vehicle 10 may thus be used as a scooter since the seat support bar 60 and the operator seat 70 are positioned forward of the horizontal foot platform 24. To convert the vehicle 10 to the bicycle mode shown in FIG. 1, the seat support bar 60 and attached seat 70 are moved to the lowered position and the stabilizer bar 62 is attached by pins 63 to lock the seat 70 at a comfortable position where the operator may conveniently reach the pedal crank 52. The vehicle 10 may be easily moved between the bicycle mode (FIG. 1) and the scooter mode (FIG. 4) when in use, and moved to the storage mode (FIG. 5) when desired.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. An operator-powered wheeled vehicle, comprising:
   a frame including a rear portion having a rear fork and a horizontal foot platform extending forward of the rear fork, and a front portion having an upwardly extending support with a sleeve at the upper end wherein the rear portion of the frame and the front portion of the frame are pivotally connected and movable between a folded storage position and an extended operating position;
   a rear wheel rotatably attached to the rear fork;
   a shaft pivotally received in the sleeve, the shaft having an upper end attached to steering handle bars, and a lower end attached to a front fork;
   a bracket attached to and extending up from the front fork;
   a rotatable pedal crank attached to the bracket;
   a front wheel rotatably attached to the front fork, and being drivably connected to the pedal crank by a continuous drive chain;
   a seat support bar having a proximal end pivotally attached to the upwardly extending support of the front portion of the frame and a distal end disposed to receive an operator seat, the seat support bar being selectively movable between a lowered position disposed over the horizontal foot platform, and a raised position disposed forward of the horizontal foot platform;
   a locking mechanism disposed to secure the rear portion of the frame and the front portion of the frame in the extended operating position, wherein the locking mechanism includes a strap hinge extending from a front section of the rear portion of the frame, the strap hinge being disposed to selectively engage and secure a lower section of the upwardly extending support when the rear and front portions of the frame are in the extended operating position.

2. The operator-powered wheeled vehicle of claim 1 further including a stabilizer bar attached to and disposed to interconnect the upwardly extending support and the seat support bar when the seat support bar is in the lowered position.

3. The operator-powered wheeled vehicle of claim 2 wherein the stabilizer bar is selectively attachable at multiple points along the upwardly extending support.

4. The operator-powered wheeled vehicle of claim 1 wherein the operator seat is adjustably attached at the distal end of the seat support bar.

5. The operator-powered wheeled vehicle of claim 4 further including an adjustment rod having one end telescopically received in the distal end of the seat support bar and another end disposed to receive the operator seat.

6. The operator-powered wheeled vehicle of claim 5 wherein the operator seat is adjustably pivotally attached to the adjustment rod.

* * * * *